Aug. 18, 1925.
C. C. FARMER
1,549,756
MOTOR VENTILATING DEVICE
Filed April 15, 1922
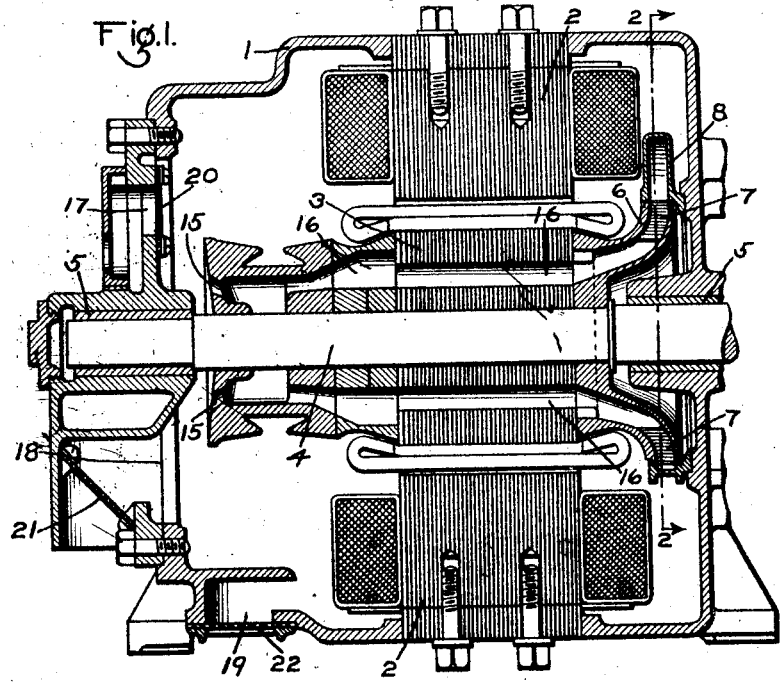
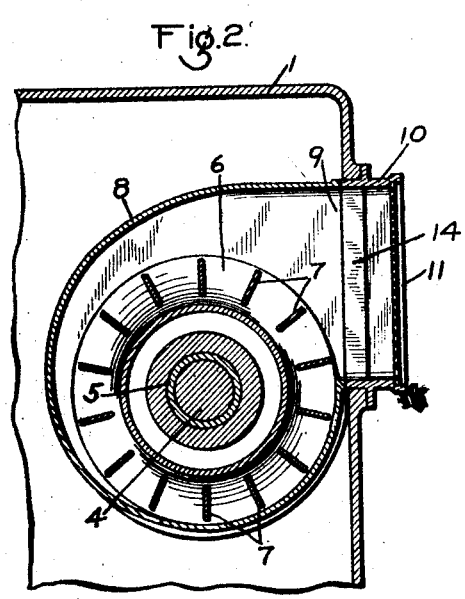
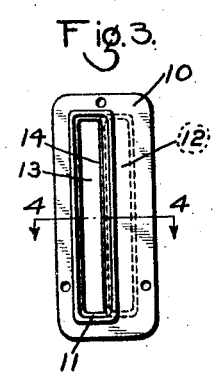
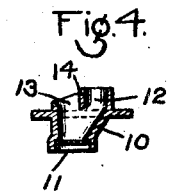
INVENTOR
CLYDE C. FARMER
BY *Wm. M. Cady*
ATTORNEY Patented Aug. 18, 1925.

1,549,756

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

MOTOR-VENTILATING DEVICE.

Application filed April 15, 1922. Serial No. 553,229.

*To all whom it may concern:*

Be it known that I, CLYDE C. FARMER, a citizen of the United States, residing at Pittsburgh, in the county of Allegheny and State of Pennsylvania, have invented new and useful Improvements in Motor-Ventilating Devices, of which the following is a specification.

This invention relates to electric motors, and more particularly to means for ventilating and cooling the motor.

The principal object of my invention is to provide improved means for ventilating an electric motor.

In the accompanying drawing; Fig. 1 is a central vertical section of an electric motor, showing my improved ventilating means applied thereto; Fig. 2 a section on the line 2—2 of Fig. 1; Fig. 3 a face view of the ventilating outlet nozzle; and Fig. 4 a section on the line 4—4 of Fig. 3.

As shown in Fig. 1, the electric motor may comprise a casing 1 containing the motor field magnets 2 and an armature 3, mounted on shaft 4 having bearings 5 in the motor casing 1. Mounted at one end of the armature 3 to rotate with the armature is a fan or blower 6 having radial vanes 7 and said fan is enclosed by a fan casing 8 which is secured to the end wall of the motor casing 1.

The peripheral wall of the casing 8 is eccentric with respect to the fan 6, so that the vanes 7 run close to the peripheral wall of the fan casing at one portion of the casing, in order to impart rotary movement to the confined air, while the wall gradually diverges from the vanes at other points, so as to provide a space for the passage of air to the outlet nozzle.

The fan casing 8 has an outlet opening 9 which is adapted to register with an outlet nozzle 10, mounted in a corresponding opening in the motor casing 1. As shown in Figs. 2, 3, and 4, the nozzle 10 is provided with an elongated rectangular outlet opening 11 which has a passage 12 adapted to register with the fan outlet opening 9 and a branch passage 13 separated from passage 12 by a wall 14 and adapted to open to the space within the motor casing 1.

At the commutator end of the armature 3 a plurality of openings 15 are provided, which communicate with corresponding passages 16 extending longitudinally through the armature and opening to the vanes 7. The end wall of the motor casing 1 adjacent to the commutator end of the armature is provided with air inlet openings 17 and 18 and an additional opening 19 may be provided through the base of the motor casing at the commutator end of the motor casing. The openings may be provided with screens 20, 21, and 22 for preventing the entrance of dust and dirt, and for a similar purpose, the communication from the atmosphere to the inlet openings may be made indirect or tortuous, as shown.

The construction is such that the ventilation may be varied to suit different operating conditions, as follows: operating with the air inlets 17 and 18 open and the outlet nozzle 11 open; with inlets 17 and 18 closed and an extended conduit or an auxiliary blower connected to 19; inlets 17 and 18 open and outlet 11 closed; and 17, 18, and 19, and outlet 11 all closed.

In operation, if the atmospheric air is reasonably clean and the operating conditions normal, the air inlets 17 and 18 and the outlet nozzle 11 may be left open and in this case when the motor is running, atmospheric air enters the motor casing through the inlet openings 17 and 18 and flows by reason of the action of the rotating fan 6, through the openings 15 of the armature 3 and through the passages 16 to the fan 6. The vanes 7 of the fan cause a centrifugal as well as a rotative movement of the air, so that an air current is established which flows out through the outlet nozzle 11.

The current of air passing out through the passage 12 and the outlet 11 induces a flow of air from the interior of the motor case 1 through the passage 13 and out through the outlet opening 11, so that at the same time the armature 3 is being cooled by air currents passing through the passages 16, the field magnets and the exterior of the armature is cooled by air currents flowing from the inlets 17 and 18 through the space within the motor casing and out through the passage 13 and outlet opening 11.

If the condition of the atmosphere in the vicinity of the motor is such that it would not be desirable to allow same to enter into the motor casing, the inlets 17 and 18 may be closed, and a long pipe may be connected to the inlet 19, so that outside air may be taken from a point where the air is clean and free from dust. An auxiliary blower may also be connected to the inlet 19 to increase the flow of air, and thus provide an increased cooling and ventilating action.

In other cases, the outlet 11 may be closed and the inlets 11 and 18 left open, in which instance, the cool air will enter the lower inlet 18 and pass through the openings 15 and passages 16 and after passing the fan 6, the current of air will be deflected from the passage 12 to the passage 13 and will then flow back through the space within the motor casing, the heated air flowing out of the casing by way of the upper opening 17.

It may sometimes be desirable to effect the ventilation of the motor without permitting air to flow into the casing from the atmosphere and in this case all of the openings 17, 18, 19, and 11 are closed and then the operation of the fan 6 merely causes a circulation of the air within the motor casing, the cooling being dependent upon the extent to which the motor casing will radiate heat.

It will now be seen that with the above described construction, the motor may be ventilated according to the needs of varying conditions of service by simply opening or closing one or more air inlet and outlet openings.

Having now described my invention, what I claim as new and desire to secure by Letters Patent, is:—

The combination with an electric motor having a motor casing and an armature mounted in said casing and provided with air passages, of a fan rotatable with said armature for effecting a circulation of air through said passages to an outlet opening in the casing, a fan enclosing casing closing off the space within the motor casing from the fan and communicating with said outlet opening, and an outlet nozzle having two separate passages leading to a common atmospheric outlet, one of said passages being connected to the fan outlet opening and the other passage to the space within the motor casing.

In testimony whereof I have hereunto set my hand.

CLYDE C. FARMER.